(12) United States Patent
Imai et al.

(10) Patent No.: US 6,271,168 B1
(45) Date of Patent: Aug. 7, 2001

(54) CATALYST FOR DECOMPOSING ORGANOHALOGEN COMPOUND

(75) Inventors: Tomoyuki Imai, Hiroshima; Satoshi Hatakeyama, Hiroshima-ken; Toshiki Matsui, Hiroshima; Yasuhiko Fujii, Otake; Tomoko Okita, Hatsukaichi, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/667,304

(22) Filed: Sep. 25, 2000

(30) Foreign Application Priority Data

Sep. 24, 1999 (JP) .................................................. 11-270916

(51) Int. Cl.[7] .............................. B01J 31/00; A62D 3/00
(52) U.S. Cl. ............................ 502/167; 588/207; 588/208
(58) Field of Search .................................. 588/208, 207; 502/167

(56) References Cited

FOREIGN PATENT DOCUMENTS

| | | |
|---|---|---|
| 4106515 | 8/1991 | (DE) . |
| 19903986 | 8/2000 | (DE) . |
| 0387417 | 9/1990 | (EP) . |
| 0702078 | 3/1996 | (EP) . |
| 0667180 | 8/1996 | (EP) . |
| 0875587 | 11/1998 | (EP) . |

*Primary Examiner*—Alan Siegel
(74) *Attorney, Agent, or Firm*—Nixon & Vanderhye

(57) ABSTRACT

A composite catalyst for decomposing an organohalogen compound of the present invention, comprises composite particles comprising:

iron compound particles having an average particle size of 0.01 to 2.0 $\mu$m, a phosphorus content of not more than 0.02% by weight based on the weight of the particles, a sulfur content of not more than 0.3% by weight based on the weight of the particles, and a sodium content of not more than 0.3% by weight based on the weight of the particles; and an amine compound, said composite catalyst having a catalytic activity capable of decomposing not less than 50% by weight of monochlorobenzene when 50 mg of a mixture comprising iron oxide particles obtained by heat-treating said iron compound particles at a temperature of 300° C. for 60 minutes in air, and the amine compound, is instantaneously contacted with $5.0 \times 10^{-7}$ mol of monochlorobenzene at a temperature of 300° C. at a space velocity of 150,000 $h^{-1}$ in an inert gas atmosphere using a pulse catalytic reactor.

14 Claims, 1 Drawing Sheet

CATALYST FOR DECOMPOSING ORGANOHALOGEN COMPOUND

BACKGROUND OF THE INVENTION

The present invention relates to a catalyst for the decomposition of an organohalogen compound, and more particularly, to a catalyst for the decomposition of an organohalogen compound for efficiently decomposing aromatic organohalogen compounds such as dioxins and precursors thereof, which are contained in a very small amount in an exhaust gas discharged from waste incinerators, or aliphatic organohalogen compounds such as trichloroethylene and dichlorometahne.

Exhaust gases discharged from incinerators for incinerating municipal solid wastes or industrial wastes contain a small amount of aromatic chlorine compounds called "dioxins" which have an extremely strong toxicity to human bodies. The dioxins are a generic name of compounds formed by substituting hydrogen atoms of dibenzo-p-dioxine, dibenzofuran or the like with chlorine atoms.

Further, aliphatic organohalogen compounds such as trichloroethylene or tetrachloroethylene have been widely used in various applications such as degreasing of metal or dry-cleaning.

These organohalogen compounds are not only difficult to decompose, but also have a carcinogenic property. Therefore, there arises such a problem that the disposal of these compounds causes environmental pollution by diffusion in air and dissolving-out into ground water or soils. There have been proposed various methods for removing these organohalogen compounds. However, any of the conventional methods has failed to establish economical and efficient techniques for decomposing the organohalogen compounds and converting the compounds into unharmful ones.

Conventionally, various techniques for removal and decomposition of the organohalogen compounds have been reported. For example, there are known a method of decomposing poly-halogenated aromatic compounds having at least five carbon atoms by heating at a temperature of 200 to 550° C. in the presence of a catalyst such as iron oxide (Japanese Patent Publication (KOKOKU) No. 6-38863 (1994)); a method of removing halogenated aromatic compounds or the like from an exhaust gas or reducing amounts thereof by heat-treating at a temperature of 300 to 700° C. in the presence of a catalyst containing iron oxide (Japanese Patent Application Laid-Open (KOKAI) No. 2-280816 (1990)); a method of introducing an inhibitor containing an activated carbon in which an amine compound is carried thereon, for inhibiting the generation of dioxins, into exhaust gas flues or the like of an incinerator (Japanese Patent Application Laid-Open (KOKAI) No. 11-9960(1999)); a method of decomposing an organohalogen compound at a temperature of from 60° C. to less than 150° C. in the presence of oxygen using a iron oxide-based and/or titanium dioxide-based solid catalyst (Japanese Patent Application Laid-Open (KOKAI) No. 11-188235(1999)); or the like.

In addition, as the methods comprising preliminarily mixing wastes with iron oxide or the like and then incinerating the wastes, there are known a method of burning combustible wastes at a temperature of not less than 850° C. under the coexistence of an acid gas neutralizing agent, iron oxide particles and the like (Japanese Patent Application Laid-Open (KOKAI) No. 8-270924(1996)); and a method comprising burning wastes in an incinerator under the coexistence of iron oxide hydroxide particles or iron oxide particles containing sulfur and sodium in less than predetermined amounts (Japanese Patent Application Laid-Open (KOKAI) No. 9-89228(1997)).

Although it has been desired to provide a method for treating an exhaust gas so as to decompose and remove organohalogen compounds contained therein, the methods described in the above publications are still unsatisfactory.

Namely, in the method described in Japanese Patent Publication (KOKOKU) No. 6-38863(1994), poly-halogenated cycloalkyl compounds and poly-halogenated aromatic compounds in fly ash generated in an incinerator are decomposed by catalysts such as iron oxide, calcium carbonate and sodium carbonate in a fixed bed. However, in this method, it is difficult to sufficiently remove the organohalogen compounds for a short period of time, and huge plant and equipment investment is required to construct a facility for converting the fly ash into unharmful substances. Such a construction is almost impossible practically.

In the method described in Japanese Patent Application Laid-Open (KOKAI) No. 2-280816(1990), after ammonia is added to an exhaust gas containing halogenated aromatic compounds, the halogenated aromatic compounds are decomposed in the presence of an iron oxide-containing catalyst in a fixed bed. Therefore, the construction of such a complicated facility after the waste incinerator also requires huge plant and equipment investment.

In the method described in Japanese Patent Application Laid-Open (KOKAI) No. 11-9960(1999), the amine-carrying activated carbon is introduced into an exhaust gas containing dioxins, so that the dioxins are adsorbed into the activated carbon by the adsorptivity thereof, and then decomposed by reacting with the amine compound. The amine-carrying activated carbon has a high adsorptivity, but is incapable of sufficiently decomposing the dioxins and inhibiting the generation of dioxins. Further, the activated carbon has a risk of ignition at an elevated temperature, thereby causing problems concerning safety.

In the method described in Japanese Patent Application Laid-Open (KOKAI) Nos. 11-188235(1999), the organohalogen compounds contained in the exhaust gas are decomposed at a temperature of from 60° C. to less than 150° C. in the presence of oxygen using the iron oxide-based and/or titanium dioxide-based solid catalysts. In this method, although the organohalogen compounds are decomposed at a relatively low temperature, the decomposition percentage (conversion rate) is low and, therefore, impractical.

In the methods described in Japanese Patent Application Laid-Open (KOKAI) Nos. 8-270924(1996) and 9-89228 (1997), it is required to sufficiently premix solid wastes with iron oxide particles. Therefore, it is not easy to conduct this method.

Meanwhile, in the incineration method using iron oxide hydroxide particles or iron oxide particles containing sulfur and sodium in not more than predetermined amounts (Japanese Patent Application Laid-Open (KOKAI) No. 9-89228(1997)), the organohalogen compounds such as dioxins in exhaust gases cannot be sufficiently decomposed due to the low monochlorobenzene decomposition percentage thereof at 300° C. as described in Table 1 (Iron Compound 4) hereinafter.

As a result of the present inventors' earnest studies for solving the above problems, it has been found that by contacting a combustion exhaust gas containing organohalogen compounds with a composite particles as an organohalogen compound-decomposition catalyst, which comprise iron compound particles having an average particle size of 0.01 to 2.0 μm, a phosphorus content of not more than 0.02% by weight, a sulfur content of not more than 0.3% by weight and a sodium content of not more than 0.3% by weight, and an amine compound, the organohalogen compounds can be decomposed at a high efficiency. The present invention has been attained on the basis of this finding.

SUMMARY OF THE INVENTION

It is an object of the present invention to provide a catalyst for efficiently decomposing aromatic organohalogen compounds such as dioxins and precursors thereof, which are contained in an exhaust gas discharged from waste incinerators, or aliphatic organohalogen compounds such as trichloroethylene and dichlorometahne.

It is an another object of the present invention to provide a method for treating an organohalogen compound by contacting a combustion exhaust gas containing organohalogen compounds with a catalyst.

To accomplish the aim, in a first aspect of the present invention, there is provided a composite catalyst for decomposing an organohalogen compound, comprising composite particles comprising:

iron compound particles having an average particle size of 0.01 to 2.0 μm, a phosphorus content of not more than 0.02% by weight based on the weight of the particles, a sulfur content of not more than 0.3% by weight based on the weight of the particles, and a sodium content of not more than 0.3% by weight based on the weight of the particles; and an amine compound, said composite catalyst having a catalytic activity capable of decomposing not less than 50% by weight of monochlorobenzene when 50 mg of a mixture comprising iron oxide particles obtained by heat-treating said iron compound particles at a temperature of 300° C. for 60 minutes in air, and the amine compound, is instantaneously contacted with $5.0 \times 10^{-7}$ mol of monochlorobenzene at a temperature of 300° C. at a space velocity of 150,000 $h^{-1}$ in an inert gas atmosphere using a pulse catalytic reactor.

In a second aspect of the present invention, there is provided a method for treating an organohalogen compound, comprising:

contacting a organohalogen compound-containing gas, with a composite catalyst for the decomposition of the organohalogen compound, the said composite catalyst having a catalytic activity capable of decomposing not less than 50% by weight of monochlorobenzene when 50 mg of a mixture comprising iron oxide particles obtained by heat-treating said iron compound particles at a temperature of 300° C. for 60 minutes in air, and the amine compound, is instantaneously contacted with $5.0 \times 10^{-7}$ mol of monochlorobenzene at a temperature of 300° C. at a space velocity of 150,000 $h^{-1}$ in an inert gas atmosphere using a pulse catalytic reactor, which composite catalyst comprise:

iron compound particles having an average particle size of 0.01 to 2.0 μm, a phosphorus content of not more than 0.02% by weight based on the weight of the particles, a sulfur content of not more than 0.3% by weight based on the weight of the particles and a sodium content of not more than 0.3% by weight based on the weight of the particles, and an amine compound.

In a third aspect of the present invention, there is provided a method of using a composite catalyst for decomposing an organohalogen compound, which composite catalyst comprises composite particles comprising:

iron compound particles having an average particle size of 0.01 to 2.0 μm, a phosphorus content of not more than 0.02% by weight based on the weight of the particles, a sulfur content of not more than 0.3% by weight based on the weight of the particles, and a sodium content of not more than 0.3% by weight based on the weight of the particles; and an amine compound, said composite catalyst having a catalytic activity capable of decomposing not less than 50% by weight of monochlorobenzene when 50 mg of a mixture comprising iron oxide particles obtained by heat-treating said iron compound particles at a temperature of 300° C. for 60 minutes in air, and the amine compound, is instantaneously contacted with $5.0 \times 10^{-7}$ mol of monochlorobenzene at a temperature of 300° C. at a space velocity of 150,000 $h^{-1}$ in an inert gas atmosphere using a pulse catalytic reactor.

DETAILED DESCRIPTION OF THE INVENTION

Figure 1:
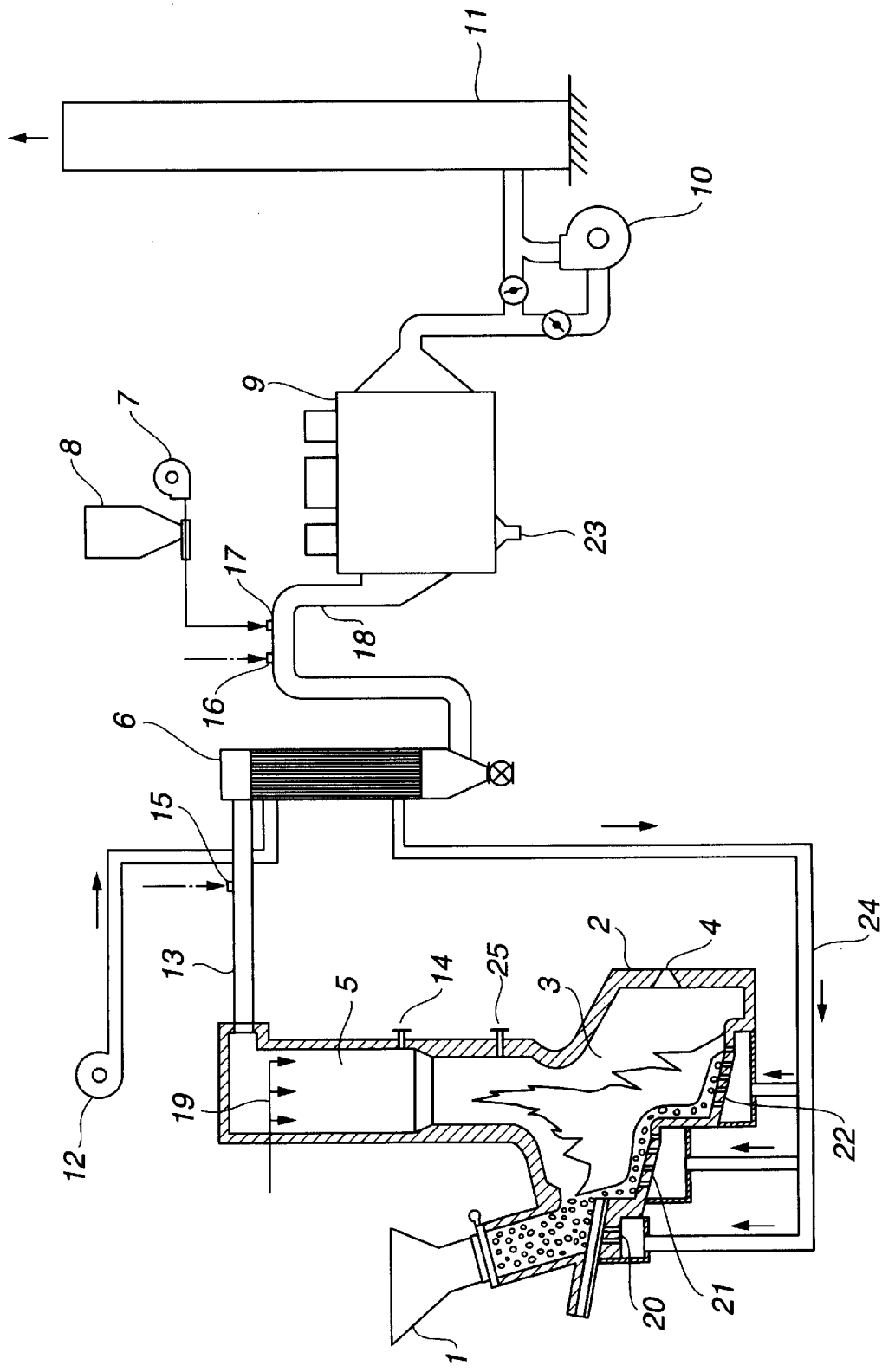
FIG. 1 is a schematic view showing an example of an intermittent operation-type solid waste incineration facility usable in the present invention.

The present invention will now be described in detail below.

First, composite particles constituting a composite catalyst for the decomposition of an organohalogen compound (hereinafter referred to as "organohalogen compound-decomposition catalyst") according to the present invention, is described.

The iron compound particles contained in the composite particles constituting the organohalogen compound-decomposition catalyst of the present invention, have an average particle size of usually 0.01 to 2.0 μm, preferably 0.02 to 2.0 μm, more preferably 0.02 to 1.0 μm.

When the average particle size of the iron compound particles is more than 2.0 μm, a sufficient activity for decomposing the organohalogen compound may not be exhibited due to deterioration in efficiency of contact with the organohalogen compound. When the average particle size of the iron compound particles is less than 0.01 μm, the particles may rather suffer from undesired agglomeration due to sintering therebetween or the like, resulting in deteriorated activity for decomposing the organohalogen compound.

The iron compound particles used in the present invention have a BET specific surface area value of usually 0.2 to 200 $m^2/g$, preferably 0.5 to 200 $m^2/g$, more preferably 0.5 to 100 $m^2/g$.

The iron compound particles used in the present invention comprises at least one selected from the group consisting of iron oxide hydroxide particles such as goethite particles, akaganeite particles and lepidocrocite particles, and iron oxide particles such as hematite particles, maghemite particles and magnetite particles. Among these particles, goethite particles and hematite particles are preferred.

The shape of the iron compound particles used in the present invention may be either a granular shape such as a spherical shape, a granular shape, an octahedral shape, a hexahedral shape or a polyhedral shape, or an acicular shape such as an acicular shape, a spindle shape or a rice grain-like shape. Among these particles, spindle-shaped particles or acicular particles are preferred.

The iron compound particles used in the present invention have a phosphorus content of usually not more than 0.02% by weight, preferably not more than 0.01% by weight, more preferably not more than 0.005% by weight. When the phosphorus content is more than 0.02% by weight, the catalyst poison ability of the phosphorus may become large, so that the activity for decomposing the organohalogen compound is deteriorated.

The iron compound particles used in the present invention have a sulfur content of usually not more than 0.3% by weight, preferably not more than 0.1% by weight, more preferably not more than 0.07% by weight. When the sulfur content is more than 0.3% by weight, the catalyst poison ability of the sulfur may become large, so that the activity for decomposing the organohalogen compound may be deteriorated.

The iron compound particles used in the present invention have a sodium content of usually not more than 0.3% by weight, preferably not more than 0.2% by weight, more preferably not more than 0.15% by weight. When the sulfur content is more than 0.3% by weight, the catalyst poison ability of the sodium may become large, so that the activity for decomposing the organohalogen compound may be deteriorated.

In the iron compound particles used in the present invention, the sum of the phosphorus, sulfur and sodium contents is preferably not more than 0.5% by weight, more preferably not more than 0.3% by weight, still more preferably not more than 0.2% by weight. When the sum of the phosphorus, sulfur and sodium contents is more than 0.5% by weight, the activity for decomposing the organohalogen compound may be deteriorated.

The iron compound particles used in the present invention exhibit a catalytic activity capable of decomposing usually not less than 20% by weight of monochlorobenzene when 50 mg of iron oxide particles obtained by heat-treating the iron compound particles at a temperature of 300° C. for 60 minutes in air, are instantaneously contacted with $5.0 \times 10^{-7}$ mol of monochlorobenzene at a temperature of 300° C. at a hourly space velocity of 150,000 $h^{-1}$ in an inert gas atmosphere using a pulse catalytic reactor.

When the monochlorobenzene decomposition activity of the iron compound particles is less than 20%, the aimed effect of decomposing the organohalogen compound according to the present invention may not be obtained. The monochlorobenzene decomposition activity of the iron compound particles used in the present invention is preferably not less than 25%, more preferably not less than 30%.

The amine compound used in the composite particles constituting the organohalogen compound-decomposition catalyst of the present invention, comprises at least one compound selected from the group consisting of alkylamines such as diethylenetriamine and triethylenetetramine; alkanolamines such as triethanolamine and diethanolamine; cyclicamines such as aniline; hexamethylenetetramine and the like.

The amine compound used in the present invention preferably has a boiling point of not less than 150° C. When the boiling point of the amine compound is less than 150° C., the amine compound may tend to be volatilized upon treating the organohalogen compound, thereby failing to exhibit the effect obtained by the combination with the iron compound particles.

The particle shape and particle size of the composite particles constituting the organohalogen compound-decomposition catalyst of the present invention are the substantially same as those of the iron compound particles.

The BET specific surface area of the composite particles constituting the organohalogen compound-decomposition catalyst of the present invention is preferably 0.2 to 200 $m^2/g$, more preferably 0.5 to 200 $m^2/g$ still more preferably 0.5 to 100 $m^2/g$.

The weight ratio between the iron compound particles and the amine compound in the composite particles constituting the organohalogen compound-decomposition catalyst of the present invention, is controlled such that the amount of the amine compound is preferably 0.1 to 10% by weight, more preferably 0.5 to 8.0% by weight, still more preferably 0.5 to 5.0% by weight based on the weight of the iron compound particles. When the content of the amine compound is less than 0.1% by weight, the amine compound may not sufficiently show the effect for accelerating decomposition of the organohalogen compound. When the content of the amine compound is more than 10% by weight, the amine compound may tend to deteriorate the activity of the iron compound catalyst for decomposing the organohalogen compound.

The composite particles constituting the organohalogen compound-decomposition catalyst of the present invention, has a catalytic activity capable of decomposing usually not less than 50% by weight, preferably not less than 55% by weight of monochlorobenzene when 50 mg of a mixture obtained by mixing iron oxide particles obtained by heat-treating the iron compound particles at a temperature of 300° C. for 60 minutes in air, with the amine compound at a predetermined ratio, is instantaneously contacted with $5.0 \times 10$ mol of monochlorobenzene at a temperature of 300° C. at a hourly space velocity of 150,000 $h^{-1}$ in an inert gas atmosphere using a pulse catalytic reactor.

When the decomposition activity of the composite particles constituting the organohalogen compound-decomposition catalyst of the present invention by the above method, is less than 50% by weight, it means that the organohalogen compounds cannot be effectively decomposed.

In general, monochlorobenzene is a typical one of the organohalogen compounds and is known as a precursor of dioxins. Therefore, the catalytic activity for the decomposition of monochlorobenzene is regarded as an index of the activity for decomposition of the organohalogen compounds including dioxins, or the activity for inhibiting the generation thereof. Meanwhile, the decomposition percentage (conversion) of monochlorobenzene is represented by the following formula:

Conversion (%)=[1-(amount of monochlorobenzene detected after reaction/amount of monochlorobenzene initially charged before reaction)]×100

Next, the process for producing the composite particles constituting the organohalogen compound-decomposition catalyst of the present invention, is described.

First, the process for producing the iron compound particles used in the present invention is described.

Among the iron compound particles used in the present invention, goethite particles may be produced, for example, by passing an oxygen-containing gas such as air through a suspension containing a ferrous iron-containing precipitate such as hydroxides of iron or iron carbonates which are obtained by reacting a ferrous salt with at least one compound selected from the group consisting of alkali hydroxides, alkali carbonates and ammonia.

Among the iron compound particles used in the present invention, the hematite particles can be produced, for example, by heat-dehydrating or heat-treating the above obtained goethite particles at a temperature of 200 to 800° C. in air; the magnetite particles can be produced, for example, by heat-reducing the above obtained hematite particles at a temperature of 300 to 600° C. in a reducing atmosphere; and the maghemite particles can be produced, for example, by heat-oxidizing the above obtained magnetite particles in a temperature of 200 to 600° C. in air.

In the production of the iron compound particles used in the present invention, it is necessary to lessen the contents of phosphorus, sulfur and sodium as catalyst poisons to not more than predetermined amounts. More specifically, as the ferrous salt solution, there are preferably used those containing less contents of phosphorus, sulfur or the like as catalyst poisons. Further, the contents of phosphorus, sulfur and sodium should be reduced by avoiding the use of sodium hexametaphosphate usually added as a sintering preventive upon heat-calcination step, and by removing sulfur ions derived from the raw ferrous materials and sodium ions derived from alkali hydroxides and/or the alkali carbonates by means of purification treatments such as washing with water or the like.

The composite particles comprising the iron compound particles and the amine compound according to the present invention can be produced by driedly mixing the iron compound particles and the amine compound together in predetermined amounts, for example, in such amounts that the amine compound is present in an amount of preferably 0.1 to 10% by weight, more preferably 0.5 to 8.0% by weight, still more preferably 0.5 to 5.0% by weight based on the weight of the iron compound particles, using a mixer such as sand mill, Henschel mixer and Nauter mixer, or a grinder such as fine mill and pin mill.

A solvent such as water or alcohol (e.g. ethanol, isopropyl alcohol) may be added to the amine compound in order to improve a wettability of the composite particles. When any solvent is used, it is preferred that the solvent be evaporated by heating or under reduced pressure.

The above mixing process using the mixer or grinder is preferably conducted under the following conditions:

(i) In case of using the sand mill, the mixing is conducted at a linear load of 5 to 50 Kg for 15 to 90 minutes.

(ii) In case of using the Henschel mixer, the mixing is conducted at a temperature of 10 to 100° C. and a stirring speed of 500 to 3000 rpm for 5 to 30 minutes.

(iii) In case of using the Nauter mixer, the mixing is conducted at a rotating velocity of 25 to 200 rpm and revolving velocity of 1 to 5 rpm for 15 to 60 minutes.

(iv) In case of using the fine mill or pin mill, the milling and mixing are conducted at a stirring speed of 1000 to 10000 rpm while adding the amine compound to the iron compound particles.

The thus obtained composite particles constituting the organohalogen compound-decomposition catalyst according to the present invention have such a configuration that the amine compound is carried on a part of the surface of each iron compound particle, when observed by an electron micrograph thereof.

Next, the method for treating the organohalogen compounds by using the organohalogen compound-decomposition catalyst of the present invention, which comprises the above composite particles, is described.

The incinerators to which the present invention can be applied, include intermittent operation-type incinerators such as mechanical batch incinerators or semi-continuous incinerators, and continuous operation-type incinerators.

One of the intermittent operation-type incinerators usable in the present invention is schematically illustrated in FIG. 1. In FIG. 1, respective reference numerals denote the following members and portions: 1: waste (municipal solid waste) hopper; 2: incinerator; 3: combustion chamber; 4: supplementary combustion burner port; 5: gas cooling chamber; 6: air preheater; 7: blower for feeding organohalogen compound-decomposition catalyst; 8: feed tank of organohalogen compound-decomposition catalyst; 9: dust collector; 10: induced draft fan; 11: chimney; 12: forced draft fan; 13 and 18: flues; 14 to 17 and 25: feed port for organohalogen compound-decomposition catalyst; 19: water sprayer; 20: drying stage of incinerator; 21: combustion stage of incinerator; 22: rear combustion stage of incinerator; 23: fly ash from dust collector; and 24: combustion air.

In operation, a combustion air is introduced into the combustion chamber 3 from the bottom thereof in such an amount 1.5 to 3.5 times a theoretical combustion air amount required for complete combustion of wastes (municipal solid wastes). As the combustion air, there is used intake air received through the forced graft fan 12 and heated by the preheater 6. The combustion chamber is provided with the supplementary combustion burner port 4. The organohalogen compound-decomposition catalyst for inhibiting the generation of dioxin, is fed through the respective feed ports 14 to 17, preferably through the feed ports 15 to 17 (namely, supplied into exhaust gases in flue 13, preheater 6 and flue 18 by a gas carrying method.

In the method for treating the organohalogen compounds according to the present invention, it is preferred that the organohalogen compound-decomposition catalyst be contacted with a gas containing the organohalogen compound. The treating temperature is usually 150 to 600° C., preferably 200 to 600° C. When the treating temperature is less than 150° C., the decomposition activity of the organohalogen compound-decomposition catalyst may be deteriorated. When the treating temperature is more than 600° C., the amine compound in the organohalogen compound-decomposition catalyst may readily undergo thermal degradation, resulting in deteriorated decomposition activity of the catalyst.

As the method of contacting the organohalogen compounds with the organohalogen compound-decomposition catalyst, there may be used the method of adding particles, granules or a slurry of the organohalogen compound-decomposition catalyst to the organohalogen compound-containing gas by an gas carrying method; or the method of passing the organohalogen compound-containing gas through a catalytic reactor of a fixed-bed type reactor, a fluidized-bed type reactor or the like which is filled with pellets of the organohalogen compound-decomposition catalyst.

In case of adding the organohalogen compound-decomposition catalyst into the organohalogen compound-containing gas by the gas carrying method, the amount of the organohalogen compound-decomposition catalyst used is preferably 0.01 to 0.5 g, more preferably 0.05 to 0.5 g, still more preferably 0.05 to 0.3 g based on 1 $Nm^3$ of the organohalogen compound-containing gas.

In case of using the catalytic reactor, a SV (space velocity) of the organohalogen compound-decomposition catalyst in the organohalogen compound-containing gas is preferably 500 to 10,000 $h^{-1}$, more preferably 500 to 8,000 $h^{-1}$, still more preferably 800 to 8,000 $h^{-1}$.

By conducting the method for treating the organohalogen compounds using the organohalogen compound-decomposition catalyst of the present invention, the concentration of dioxin in the exhaust gas discharged, for example, through an outlet of an electric dust collector of waste incineration facilities can be reduced to usually not more than 2.0 ngTEQ/Nm$^3$, preferably not more than 1.8 ngTEQ/Nm$^3$, more preferably not more than 1.5 ngTEQ/Nm$^3$.

Further, by conducting the treatment of the organohalogen compounds using the organohalogen compound-decomposition catalyst of the present invention, for example, when 50 mg of a composite (mixture) is instantaneously contacted with $5.0 \times 10^{-7}$ mol of the organohalogen compound at a temperature of 300° C. at a hourly space velocity of 150,000 h$^{-1}$ in an inert gas atmosphere using a pulse catalytic reactor, usually not less than 50% by weight, preferably not less than 55% by weight of the organohalogen compound are decomposed.

In the method for treating the organohalogen compounds according to the present invention, an acid gas neutralizing agent and/or activated carbon particles may be used jointly with the organohalogen compound-decomposition catalyst of the present invention.

The acid gas neutralizing agents may include alkali earth metal compounds such as calcium hydroxide, calcium oxide, calcium carbonate, magnesium oxide, magnesium carbonate and dolomite; and alkali metal compounds such as lithium carbonate, sodium carbonate, sodium hydrogen carbonate and potassium hydrogen carbonate. Among these compounds, the calcium compounds are preferred, and calcium hydroxide is more preferred. The acid gas neutralizing agent has an average particle size ($D_{50}$) (particle size of 50% of a total volume thereof when measured by a dry particle size distribution meter) of preferably not more than 20 μm, and a BET specific surface area of preferably not less than 0.5 m$^2$/g.

The activated carbon particles has an average particle size ($D_{50}$) (particle size of 50% of a total volume thereof when measured by a dry particle size distribution meter) of preferably not more than 50 μm, and a BET specific surface area of preferably not less than 600 m$^2$/g.

The important point of the present invention is that by using the organohalogen compound-decomposition catalyst constituted by the composite particles comprising the iron compound particles and the amine compound which is carried on a part of the surface of each iron compound particles, the organohalogen compound can be effectively decomposed.

The reason why the organohalogen compound can be effectively decomposed, is considered as follows. That is, it is considered that due to the fact that the iron compound particles itself exhibits an excellent decomposition activity; the amine compound carried on a part of the surface of each iron compound particle accelerates the adsorption reaction of the organohalogen compound thereonto; and both the iron compound and the amine compound are exposed to the surface of the composite catalyst, so that the decomposition reaction of the organohalogen compound adsorbed can be accelerated. Further, it is considered that the amine compound accelerates not only the adsorption of the organohalogen compound but also the dechlorination reaction thereof.

Thus, the organohalogen compound-decomposition catalyst of the present invention can effectively decompose dioxins or precursors thereof and, therefore, is suitable as the catalyst for the decomposition of the organohalogen compounds.

EXAMPLES

The present invention is described in more detail by Examples and Comparative Examples, but the Examples are only illustrative and, therefore, not intended to limit the scope of the present invention.

Various properties were measured by the following methods.

(1) The average particle size of the iron compound particles and organohalogen compound-decomposition catalyst was expressed by the value measured from an electron micrograph. The specific surface area of the iron compound particles was expressed by the value measured by a BET method.

(2) The contents of phosphorus and sodium contained in the iron compound particles were expressed by the values measured by an inductively coupled plasma atomic emission spectrometer (SPS-4000, manufactured by Seiko Denshi Kogyo Co., Ltd.).

(3) The content of sulfur contained in the iron compound particles was expressed by the value measured by a Carbon-Sulfur Analyzer (EMIA-2200 Model, manufactured by Horiba Seisakusho Co., Ltd.).

(4) The catalyst property of the organohalogen compound-decomposition catalyst was measured by the following method.

That is, 50 mg of a composite material comprising iron oxide particles ($Fe_2O_3$) obtained by heat-treating the iron compound particles at a temperature of 300° C. for 60 minutes in air, and the amine compound, was instantaneously contacted with $5.0 \times 10^{-7}$ mol of monochlorobenzene at a temperature of 300° C. at a hourly space velocity of 150,000 h$^{-1}$ in an inert gas atmosphere using a pulse catalytic reactor. The catalyst property of the composite catalyst was expressed by the concentration of monochlorobenzene decomposed in the above process.

The pulse catalytic reactor used comprises a reactor portion and a gas chromatography portion which is constituted by Gas Chromatography-Mass Spectroscopy GC/MSQP-5050 (manufactured by Shimadzu Seisakusho Co., Ltd.).

Meanwhile, the above evaluation method was conducted by referring to methods described in the literatures (e.g., R. J. Kobes, et al, "J. Am. Chem. Soc.", 77, 5860(1955) or "Experimental Chemistry II-Reaction and Velocity" edited by Chemical Society of Japan and published by Maruzen, Tokyo (1993)).

Example 1

<Iron Compound Particles>

As the iron compound particles, there were used spindle-shaped goethite particles having an average particle size of 0.24 μm, a phosphorus content of 0.001% by weight, a sulfur content of 0.05% by weight, a sodium content of 0.09% by weight, and a BET specific surface area of 90 m$^2$/g.

When measured by the above evaluation method, the goethite particles exhibited a monochlorobenzene decomposition percentage at a temperature of 300° C. of 32%.

<Production of Organohaloqen Compound-decomposition Catalyst>

1.5 kg of the spindle-shaped goethite particles and 75 g of triethanolamine (5.0% by weight based on the weight of the goethite particles) were dry-mixed together at a temperature of 50° C. for 5 minutes in a Henschel mixer (nominal capacity: 10 liters) operated at 1,440 rpm, thereby obtaining goethite particles carrying triethanol amine thereon.

The thus obtained triethanol amine-carrying goethite particles exhibited a monochlorobenzene decomposition percentage at a temperature of 300° C. of 86% when measured by the above evaluation method.

<Decomposition Test for Dioxins>

Dry municipal solid wastes were charged into the intermittent operation-type incineration facility used in the decomposition test, which is schematically illustrated in FIG. 1, (municipal solid wastes incineration capacity when operated for 16 hours a day: 30 tons per day). Then, the above the organohalogen compound-decomposition catalyst was spray-added into the exhaust gas (gas temperature: 262° C.) through a feed port 16 in an amount of 0.25% by weight based on the weight of the dry municipal solid wastes for 16 hours, i.e., for a period from the start-up to the shut-down via steady operation of the incinerator, by an air carrying method.

The concentration of dioxin was expressed by the average of values obtained when the exhaust gas sampled at an outlet of the electric dust collector 9 was measured for 4 hours subsequent to the elapse of 2 hours from the start-up of the incinerator. The measurement of the concentration of dioxin in the exhaust gas was conducted according to the method approved by Waste Matter Research Foundation (15, Kagurazaka 1-chome, Shinjuku-ku, Tokyo).

As a result, it was confirmed that the concentration of dioxin in the exhaust gas sampled at the outlet of the electric dust collector was 1.5 ngTEQ/Nm$^3$.

As a blank test, the incinerator was similarly operated without the addition of the organohalogen compound-decomposition catalyst, and the exhaust gas discharged therefrom were measured similarly.

In the blank test, the concentration of dioxin in the exhaust gas sampled at the outlet of the electric dust collector was 16 ngTEQ/Nm$^3$.

From the above results, it was recognized that by using the organohalogen compound-decomposition catalyst of the present invention, the concentration of dioxin as one of the organohalogen compounds could be effectively reduced.

<Iron Compounds 1 to 5>

As the iron compound for the organohalogen compound-decomposition catalyst, iron compounds 1 to 5 were prepared. Various properties of the iron compounds are shown in Table 1.

Examples 2 to 5 and Comparative Examples 1 to 3
<Composite Catalysts 1 to 7>

The same procedure as defined in Example 1 was conducted except that kind of iron compound and kind and amount of amine compound were varied, thereby obtaining composite catalysts. In Comparative Example 3 (composite catalyst 7), silica gel having no catalytic activity in itself was used instead of the iron compound. Various properties of the obtained composite catalysts are shown in Table 2.

Examples 6 to 8 and Comparative Examples 4 to 5
<Dioxin Decomposition Test>

The same procedure as defined in Example 1 was conducted except that kind of organohalogen compound-decomposition catalyst was varied, thereby performing decomposition tests for dioxin. Various conditions of the dioxin decomposition tests and the results thereof are shown in Table 3.

Examples 9 to 13 and Comparative Examples 6 to 11
<Decomposition Test for Other Organohalogen Compounds>

50 mg of the composite catalyst was instantaneously contacted with $5.0 \times 10^{-7}$ mol of the organohalogen compound at 300° C. at an hourly space velocity of 150,000 h$^{-1}$ in an inert gas atmosphere using a pulse catalytic reactor. The catalyst property of the composite catalyst was expressed by the concentration of the organohalogen compound decomposed upon the above contact.

Meanwhile, the decomposition percentage (conversion) of the organohalogen compound is represented by the following formula:

Conversion (%)=[1-(amount of organohalogen compound detected after reaction/amount of organohalogen compound initially charged before reaction)]×100

The results of the above decomposition tests for the other organohalogen compounds are shown in Table 4.

TABLE 1

| Iron compound catalyst | Properties of iron compound | | |
|---|---|---|---|
| | Kind | Average particle size ($\mu$m) | BET specific surface area (m$^2$/g) |
| Iron compound 1 | Acicular goethite | 0.25 | 85 |
| Iron compound 2 | Spindle-shaped goethite | 0.25 | 83 |
| Iron compound 3 | Spindle-shaped hematite | 0.30 | 52 |
| Iron compound 4 | Spindle-shaped goethite | 0.30 | 71 |
| Iron compound 5 | Acicular hematite | 0.30 | 54 |

| Iron compound catalyst | Properties of iron compound | | | Catalyst property (Adsoprtion and conversion of chlorobenzene at 300° C.) (%) |
|---|---|---|---|---|
| | Phosphorus content (wt. %) | Sulfur content (wt. %) | Sodium content (wt. %) | |
| Iron compound 1 | 0.002 | 0.05 | 0.08 | 33 |
| Iron compound 2 | 0 | 0.01 | 0.05 | 37 |
| Iron compound 3 | 0.002 | 0.01 | 0.07 | 35 |
| Iron compound 4 | 0.49 | 0.08 | 0.18 | 11 |
| Iron compound 5 | 0.01 | 0.01 | 0.60 | 18 |

TABLE 2

| Examples and Comparative Examples | Properties of organohalogen compound-decomposition catalyst | | | |
|---|---|---|---|---|
| | Composite catalyst | Kind of iron compound and silica gel | Amine compound | |
| | | | Kind | Boiling point (° C.) |
| Example 2 | Composite material 1 | Iron compound 1 | Triethanol-amine | 360 |
| Example 3 | Composite material 2 | Iron compound 2 | Triethylene-tetramine | 278 |
| Example 4 | Composite material 3 | Iron compound 3 | Aniline | 184 |
| Example 5 | Composite material 4 | Iron compound 1 | Triethanol-amine | 360 |
| Comparative Example 1 | Composite material 5 | Iron compound 4 | Triethanol-amine | 360 |
| Comparative Example 2 | Composite material 6 | Iron compound 5 | Triethylene-tetramine | 278 |

TABLE 2-continued

|  | Properties of organohalogen compound-decomposition catalyst | | | |
|---|---|---|---|---|
| Examples and Comparative Examples | Composite catalyst | Kind of iron compound and silica gel | Amine compound Kind | Boiling point (° C.) |
| Comparative Example 3 | Composite material 7 | Silica gel | Triethanolamine | 360 |
| Example 2 | 5.0 | 0.25 | 55 | 88 |
| Example 3 | 5.0 | 0.25 | 54 | 95 |
| Example 4 | 5.0 | 0.30 | 30 | 86 |
| Example 5 | 1.0 | 0.25 | 82 | 75 |
| Comparative Example 1 | 5.0 | 0.30 | 43 | 22 |
| Comparative Example 2 | 5.0 | 0.30 | 32 | 32 |
| Comparative Example 3 | 5.0 | 150 | 250 | 10 |

TABLE 3

| Examples and Comparative Examples | Organohalogen compound-decomposition catalyst Kind | Amount added (based on dry waste) (%) |
|---|---|---|
| Example 6 | Composite catalyst 1 | 0.25 |
| Example 7 | Composite catalyst 2 | 0.25 |
| Example 8 | Composite catalyst 3 | 0.25 |
| Comparative Example 4 | Composite catalyst 5 | 0.25 |
| Comparative Example 5 | Iron compound 1 | 0.25 |

| Examples and Comparative Examples | Organohalogen compound-decomposition catalyst Adding position | |
|---|---|---|
| Example 6 | Before electric dust collector | at 16 in FIG. 1 |
| Example 7 | Before air preheater | at 15 in FIG. 1 |
| Example 8 | Before electric dust collector | at 16 in FIG. 1 |
| Comparative Example 4 | Before electric dust collector | at 16 in FIG. 1 |
| Comparative Example 5 | Before electric dust collector | at 16 in FIG. 1 |

| Examples and Comparative Examples | Organohalogen compound-decomposition catalyst Gas temperature at adding position (° C.) | Amount of Organohalogen compound-decomposition catalyst (g/Nm³) | Concentration of dioxin in exhaust gas (at outlet of electric dust collector) (ngTEQ/Nm³) |
|---|---|---|---|
| Example 6 | 261 | 0.10 | 1.1 |
| Example 7 | 350 | 0.10 | 0.82 |
| Example 8 | 262 | 0.10 | 1.3 |
| Comparative Example 4 | 260 | 0.10 | 12 |
| Comparative Example 5 | 260 | 0.10 | 2.1 |

TABLE 4

| Examples and Comparative Examples | Kind of organohalogen compound | Kind of organohalogen compound-decomposition catalyst | Conversion of organohalogen compound (%) |
|---|---|---|---|
| Example 9 | Monochlorophenol | Composite catalyst 1 | 93 |
| Example 10 | Monochlorophenol | Composite catalyst 2 | 97 |
| Example 11 | Monochlorophenol | Composite catalyst 3 | 90 |
| Example 12 | Trichloroethylene | Composite catalyst 1 | 97 |
| Example 13 | Trichloroethylene | Composite catalyst 4 | 86 |
| Comparative Example 6 | Monochlorophenol | Composite catalyst 5 | 24 |
| Comparative Example 7 | Monochlorophenol | Iron compound 1 | 35 |
| Comparative Example 8 | Monochlorophenol | Composite catalyst 7 | 12 |
| Comparative Example 9 | Trichloroethylene | Composite catalyst 6 | 45 |
| Comparative Example 10 | Trichloroethylene | Iron compound 1 | 41 |
| Comparative Example 11 | Trichloroethylene | Composite catalyst 7 | 16 |

What is claimed is:

1. A composite catalyst for decomposing an organohalogen compound, comprising composite particles comprising:

iron compound particles having an average particle size of 0.01 to 2.0 $\mu$m, a phosphorus content of not more than 0.02% by weight based on the weight of the particles, a sulfur content of not more than 0.3% by weight based on the weight of the particles, and a sodium content of not more than 0.3% by weight based on the weight of the particles; and an amine compound, said composite catalyst having a catalytic activity capable of decomposing not less than 50% by weight of monochlorobenzene when 50 mg of a mixture comprising iron oxide particles obtained by heat-treating said iron compound particles at a temperature of 300° C. for 60 minutes in air, and the amine compound, is instantaneously contacted with $5.0 \times 10^{-7}$ mol of monochlorobenzene at a temperature of 300° C. at a space velocity of 150,000 h$^{-1}$ in an inert gas atmosphere using a pulse catalytic reactor.

2. A composite catalyst according to claim 1, wherein said iron compound particles have a BET specific surface area of 0.2 to 200 m²/g.

3. A composite catalyst according to claim 1, wherein said iron compound particles are iron oxide hydroxide particles or iron oxide particles.

4. A composite catalyst according to claim 1, wherein the sum of the phosphorus content, the sulphur content and the sodium content is not more than 0.5% by weight based on the weight of the iron compound particles.

5. A composite catalyst according to claim 1, wherein said amine compound is alkyl amine or alkanol amine.

6. A composite catalyst according to claim 1, wherein said amine compound has a boiling point of not less than 150° C.

7. A composite catalyst according to claim 1, wherein said amine compound is present in an amount of 0.1 to 10% by weight based on. The weight of the iron compound particles.

8. A composite catalyst according to claim 1, further having a BET specific surface area of 0.2 to 200 m²/g.

9. A method for treating an organohalogen compound, comprising:

contacting a organohalogen compound-containing gas with a composite catalyst for the decomposition of the organohalogen compound comprising iron compound particles having an average particle size of 0.01 to 2.0 μm, a phosphorus content of not more than 0.02% by weight based on the weight of the particles, a sulfur content of not more than 0.3% by weight based on the weight of the particles and a sodium content of not more than 0.3% by weight based on the weight of the particles, and an amine compound; and having a catalytic activity capable of decomposing not less than 50% by weight of monochlorobenzene when 50 mg of a mixture comprising iron oxide particles obtained by heat-treating said iron compound particles at a temperature of 300° C. For 60 minutes in air, and the amine compound, is instantaneously contacted with $5.0 \times 10^{-7}$ mol of monochlorobenzene at a temperature of 300° C. at a space velocity of 150,000 $h^{-1}$ in an inert gas atmosphere using a pulse catalytic reactor.

10. A method according to claim 9, wherein said organohalogen compound-containing gas is contacted with said composite catalyst by adding said composite catalyst in the form of particles or a slurry, into said organohalogen compound-containing gas by a gas carrying method, or by passing said organohalogen compound-containing gas through a fix bed-type or fluidized bed-type catalytic reactor filled with pellets of said composite catalyst.

11. A method according to claim 9, wherein the amount of the composite catalyst used in the gas carrying method is 0.01 to 0.5 g based on 1 $Nm^3$ of the organohalogen compound-containing gas.

12. A method according to claim 9, wherein the space velocity of the organohalogen compound-decomposition catalyst is 500 to 10,000 $h^{-1}$ in the organohalogen compound-containing gas.

13. A method according to claim 9, wherein the amount of said amine compound used is 0.1 to 10% by weight based on the weight of the iron compound particles.

14. A method of using a composite catalyst for decomposing an organohalogen compound, which composite catalyst comprises composite particles comprising:

iron compound particles having an average particle size of 0.01 to 2.0 μm, a phosphorus content of not more than 0.02% by weight based on the weight of the particles, a sulfur content of not more than 0.3% by weight based on the weight of the particles, and a sodium content of not more than 0.3% by weight based on the weight of the particles; and an amine compound, said composite catalyst having a catalytic activity capable of decomposing not less than 50% by weight of monochlorobenzene when 50 mg of a mixture comprising iron oxide particles obtained by heat-treating said iron compound particles at a temperature of 300° C. For 60 minutes in air, and the amine compound, is instantaneously contacted with $5.0 \times 10^{-7}$ mol of monochlorobenzene at a temperature of 300° C. at a space velocity of 150,000 $h^{-1}$ in an inert gas atmosphere using a pulse catalytic reactor.

* * * * *